Dec. 17, 1935.   W. R. HARDING ET AL   2,024,731
ELEVATOR CONTROL SYSTEM
Filed April 26, 1935   3 Sheets-Sheet 1
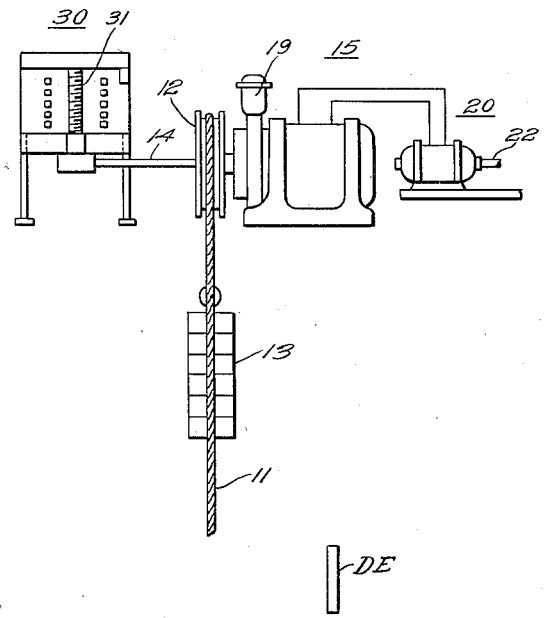
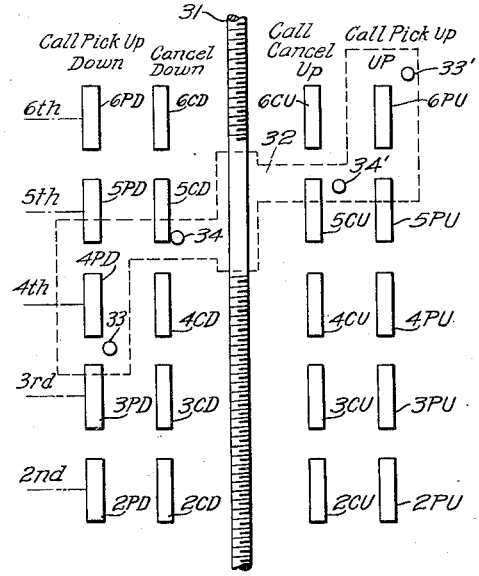
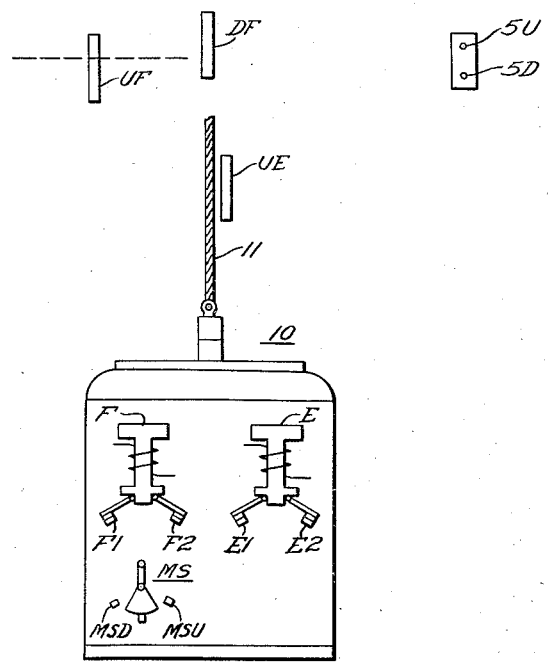
INVENTORS
William R. Harding and
Edgar M. Bouton.
BY
ATTORNEY Dec. 17, 1935.  W. R. HARDING ET AL  2,024,731
ELEVATOR CONTROL SYSTEM
Filed April 26, 1935  3 Sheets-Sheet 2

WITNESSES:
C. J. Weller.
R R Lockwood

INVENTORS
William R. Harding and
Edgar M. Bouton,
BY
ATTORNEY

Dec. 17, 1935.  W. R. HARDING ET AL  2,024,731
ELEVATOR CONTROL SYSTEM
Filed April 26, 1935  3 Sheets-Sheet 3
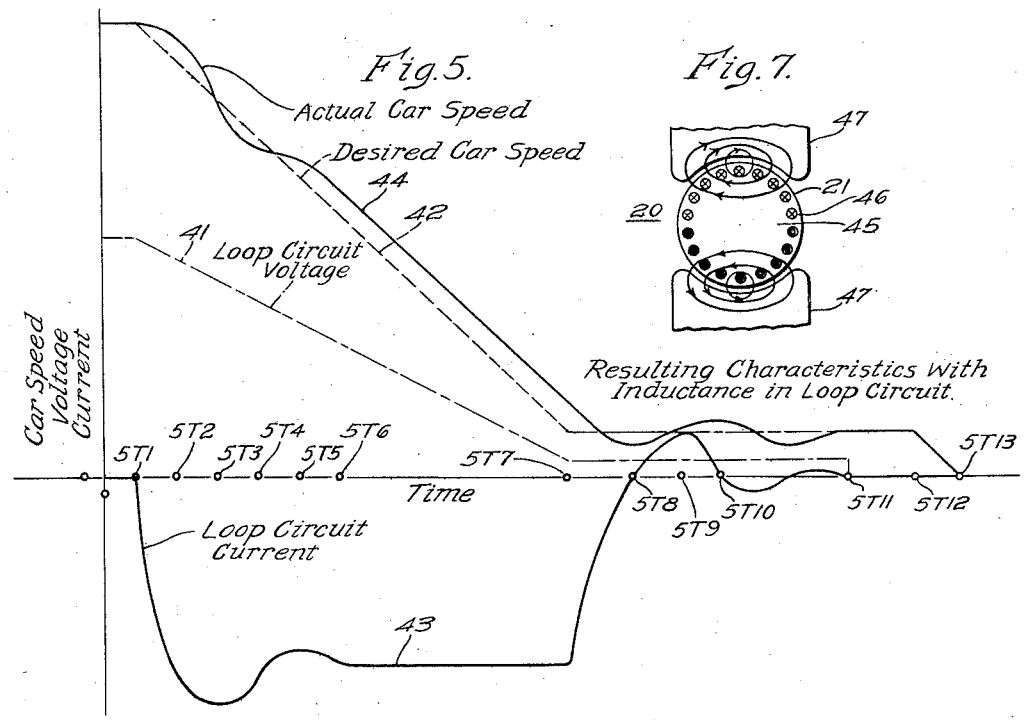
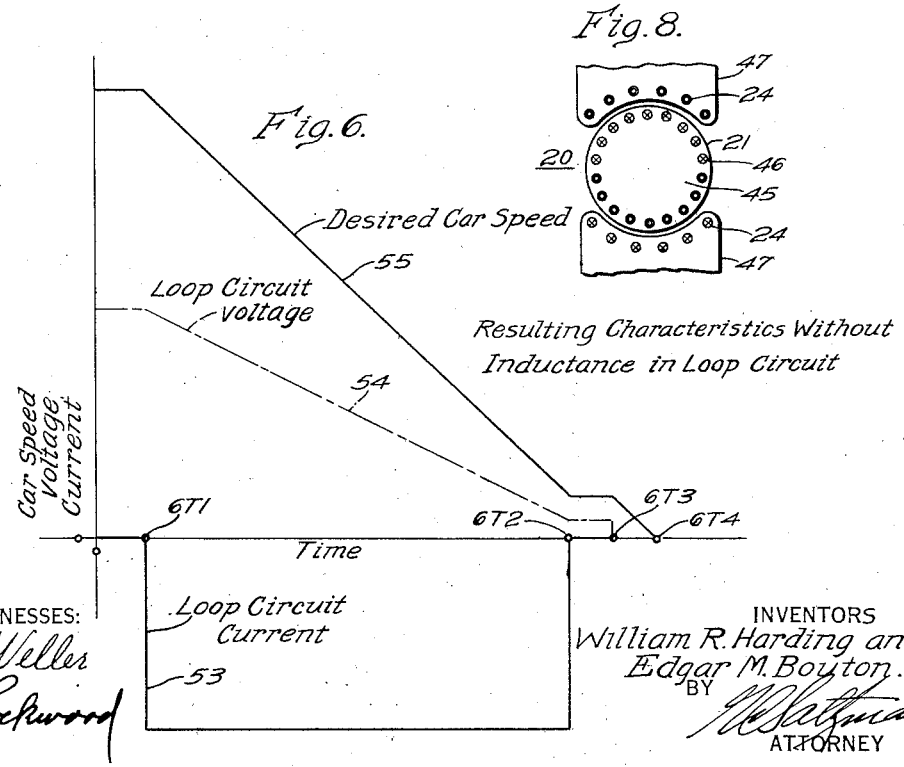
WITNESSES:
INVENTORS
William R. Harding and
Edgar M. Boyton.
BY
ATTORNEY Patented Dec. 17, 1935

2,024,731

UNITED STATES PATENT OFFICE 2,024,731

ELEVATOR CONTROL SYSTEM

William R. Harding, Wilkinsburg, Pa., and Edgar M. Bouton, Chicago, Ill., assignors to Westinghouse Electric Elevator Company, Chicago, Ill., a corporation of Illinois Application April 26, 1935, Serial No. 18,292

19 Claims. (Cl. 172—152)

Our invention relates, generally, to electric elevator systems, and it has particular relation to control systems therefor.

In the operation of elevator cars at high speeds, such as 1200 to 1600 feet per minute, many variable factors influencing the desired operating characteristics of the system become of increasing importance, as compared to their importance in connection with the operation of the elevator car in systems in which low speeds, such as 400 to 600 feet per minute are employed. This is particularly true when the operating periods between starting and running conditions and between full speed and landing speed are considered. When it is understood that the same dynamo-electric devices must be employed for starting and running the elevator car, and also for reducing the speed thereof to landing speed, preparatory to stopping it at a floor, it will be appreciated that the equipment must operate under widely varying conditions.

In order to control the operation of the elevator car in the hatchway, a variable voltage or generator field control system is provided, which includes a hoisting dynamo-electric device having driving connection with the elevator car and a driven dynamo-electric device, the armature of which is connected in loop circuit relation to the armature of the hoisting dynamo-electric device. The driven dynamo-electric device may be coupled to any suitable driving mechanism, which will permit the return of power thereto in order to take advantage of the dynamic or regenerative braking characteristics of the variable voltage control system. Both of the devices are provided with separately excited main field windings. The control of the speed and direction of movement of the elevator car is effected principally by varying and reversing the excitation which is applied to the separately excited field winding of the driven dynamo-electric device. However, certain speed changes are also effected by altering to a certain degree the excitation which is applied to the separately excited main field winding of the hoisting dynamo-electric device.

Depending upon the load carried by the elevator car and the friction in the mechanism associated therewith, the dynamo-electric devices may either be drawing power from the power source to operate the car, or may be returning it thereto. In most instances, when the speed of the car is to be reduced to landing speed, preparatory to stopping it at a floor, a considerable amount of power is returned through dynamic or regenerative braking action to the power source. Under these conditions, the hoisting dynamo-electric device functions as a generator, and the driven dynamo-electric device functions as a motor, to operate the driving device, such as an induction motor, as an asynchronous generator.

It is of utmost importance that this dynamic or regenerative braking action be employed in order to obtain a smooth deceleration of the elevator car. When it is realized that the speed of the elevator car must be reduced from, for example, a running speed of 1200 feet per minute to a landing speed of, for example, 25 feet per minute, it will be appreciated that considerable kinetic energy must be removed from the moving members of the elevator system, and furthermore, that this kinetic energy must be removed in a uniform manner. Otherwise, the operation of the elevator car during the deceleration period will be erratic and will cause severe discomfort to the passengers carried thereby.

When the speed of the elevator car is to be reduced to landing speed, the change takes place at a uniform rate. Since a substantially constant excitation is applied to the separately excited field winding of the hoisting dynamo-electric device, a substantially constant current is caused to flow in the loop circuit of the dynamo-electric device during the dynamic braking period. It is necessary, however, for the current in the loop circuit to reach the constant value which it must obtain, in order to provide the desired dynamic or regenerative braking action. Any delay in the current in the loop circuit in arriving at its final value at the initiation of the slowdown period or in again being reduced from this value at the termination of the slowdown period, causes the deceleration of the elevator car to depart from the desired rate. The delay in the change of current flow in the loop circuit is caused by the inductance of the loop circuit, a principal part of which comprises the inductance of the armatures of the dynamo-electric devices. When the inductances of the armatures of the dynamo-electric devices are neutralized, the principal factor in delaying the change of flow of current in the loop circuit is removed. As a result, the deceleration of the elevator car will take place at the desired rate and it will, therefore, be unnecessary to prolong the time allotted for decelerating the car to permit it to operate at the landing speed without any departure from the desired landing speed.

Since the flow of current in the loop circuit does not immediately reach its final value at the beginning of the slowdown period, because of the inductance in the loop circuit, an action takes place in the operation of the elevator car which may be termed "overshooting", that is, since there is a certain delay in the regenerative current reaching the final value, the car has not been decelerated at the desired rate, so that when the value of the current is correct, the speed of the car is too high. Therefore, the current in the loop circuit overshoots the final desired value as the system attempts to decrease the speed of the elevator car at a faster rate. This action continues until the speed of the car is at the desired rate, but at this time, the current flowing in the loop circuit is at a greater value than is required to provide the desired rate of deceleration. Because of the inductance in the loop circuit, the current cannot immediately change to the final steady-state value and, therefore, the speed of the car is momentarily reduced to a value which is lower than that desired. This action continues for a time at the beginning of the slowdown period, depending upon the constants of the circuit and the load carried by the elevator car.

Due to the foregoing described action, the speed of the elevator car may not be reduced at the termination of the slowdown period to the desired landing speed. At this time, it is no longer necessary to apply the regenerative braking action and it is desirable that the current in the loop circuit immediately change from the steady-state value to a much reduced value. However, due to the inductance in the loop circuit, this change takes place at a relatively slow rate. As a result, the speed of the elevator car may be reduced considerably below the landing speed, and in some instances, the movement of the car may be completely arrested momentarily at an appreciable distance from the floor level where it is desired to stop. Therefore, a period of instability occurs just prior to the arrival of the car at the floor. Since it must be accelerated to the landing speed, power current is then caused to flow through the loop circuit in a direction opposite to the direction of flow of regenerative current. However, due to the inductance in the loop circuit, this current does not immediately decrease as soon as the landing speed is reached, but it continues to flow, thereby causing the speed of the elevator car to increase beyond the desired landing speed. This period of instability makes difficult the accurate adjustment of the system for landing at the proper floor level. The extent of this period of instability depends upon the constants of the circuit and the load carried by the elevator, as in the case where the car overshoots.

As will be set forth in detail hereinafter, the inductive effect of the armature of the driven dynamo-electric device constitutes the principal impediment to change of current flow in the loop circuit. Therefore, when the inductance of the armature of the driven dynamo-electric device is neutralized, the change of flow of current in the loop circuit will be relatively unimpeded and the desired deceleration or speed-time characteristic of the elevator car may be obtained.

The object of our invention, generally stated, is to provide an elevator control system for the operation of elevator cars at high speeds, such as 1200 to 1600 feet per minute, which shall be simple and efficient in operation, and which may be readily and economically manufactured and installed.

An important object of our invention is to provide for changing the speed of an elevator car with a minimum of deviation from a predetermined desired speed-time relationship.

Another important object of our invention is to provide for reducing the effect of inductance in the loop circuit of a variable voltage system disposed to operate an elevator car in order to permit the speed of the car to be changed with a minimum of deviation from a predetermined rate of deceleration.

Another object of our invention is to provide a winding in the driven dynamo-electric device of a variable voltage elevator system for neutralizing the effect of the inductance of the armature in opposing the change of current flow in the loop circuit of the system.

A further object of our invention is to provide a neutralizing winding in the pole faces of the driven dynamo-electric device of a variable voltage elevator system connected in series circuit relation with the armature in such manner as to generate flux in opposition to the flux generated by the current in the armature to reduce the inductive effect of the armature in opposing the change of flow of current in the loop circuit of the system.

Still another object of our invention is to provide a winding in each of the dynamo-electric devices of a variable voltage elevator system for neutralizing the effects of the inductances of the armatures of these devices in opposing the change of current flow in the loop circuit of the system.

A still further object of our invention is to provide a neutralizing winding in the pole faces of each of the dynamo-electric devices of a variable voltage elevator system connected in series circuit relation with the armatures thereof in such manner as to generate flux in opposition to the flux generated by the current in the armatures to reduce the inductive effects of the armatures in opposing the change of flow of current in the loop circuit of the system.

Other objects of our invention will, in part, be obvious, and in part, appear hereinafter.

Accordingly, our invention is disclosed in the embodiment hereof shown in the accompanying drawings, and comprises the features of construction, combination of elements, and arrangement of parts, which will be exemplified in the construction hereinafter set forth, and the scope of the application of which will be indicated in the appended claims.

For a more complete understanding of the nature and scope of our invention, reference may be had to the following detailed description, taken in connection with the accompanying drawings, in which:

Fig. 1 illustrates diagrammatically the arrangement of an elevator car arranged to be operated by a driving mechanism in a hatchway;

Fig. 2 illustrates the layout of a floor selector which may be employed for controlling the operation of the elevator car;

Figures 3, 4:
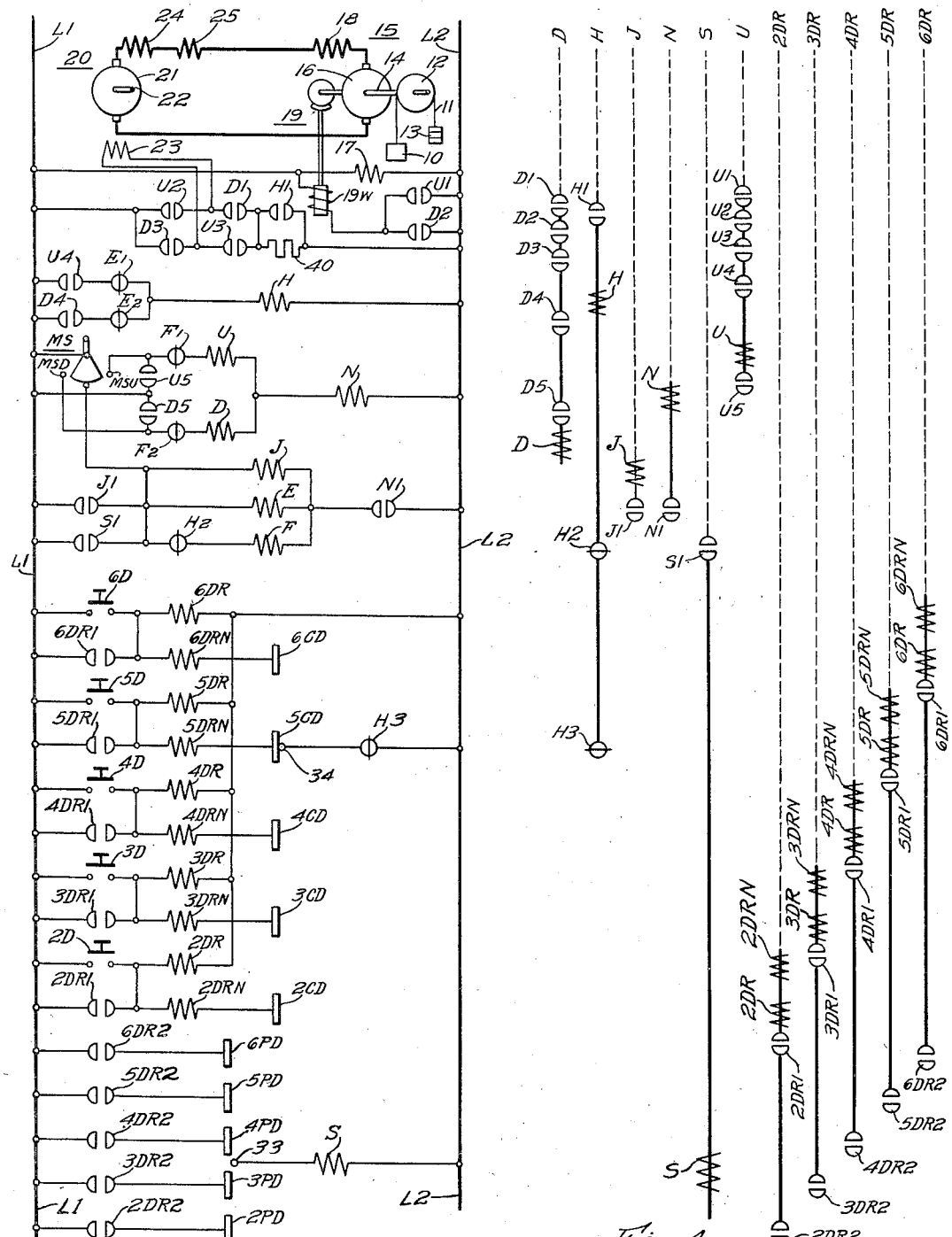
Fig. 3 illustrates diagrammatically the circuit connections which may be employed in practicing our invention.
Fig. 4 illustrates the physical relationship of the contact members and operating windings of certain switches and relays illustrated in Fig. 3.

Figs. 5 and 6 shows certain curves which demonstrate the operating characteristics of an elevator system under different conditions; and Figs. 7 and 8 are diagrammatic views and are, respectively, associated with Figs. 5 and 6 to illustrate the effect of the novel features of our invention.

According to our invention, we provide a variable voltage system for controlling the operation of an elevator car in a hatchway. Since it is necessary to take advantage of the dynamic or regenerative braking characteristics of the variable voltage system, it is essential that the inductance of the loop circuit be reduced to a minimum, so that the current, required for decelerating the elevator car, may arrive at its final value with a minimum of delay. With a view to reducing the inductance of the loop circuit to a minimum, we have provided neutralizing windings in the pole faces of both of the dynamo-electric devices. The neutralizing windings are arranged to be connected in series circuit relation with the respective armatures of the devices, and in such manner that the flux generated thereby opposes the flux generated by the current flowing through the armatures. In this manner, the inductive effects of the armatures in opposing the change of current flow through the loop circuit may be minimized or entirely neutralized.

In many instances, it is unnecessary to provide the neutralizing winding for the hoisting dynamo-electric device. This device is normally operated with the separately excited field winding thereof fully excited, and particularly during the slow-down period this winding is excited at its maximum value. Under these conditions, the field structure of this device is substantially saturated and, therefore, the neutralizing winding in this device is not of great importance.

Since the control of the system is effected principally by varying the excitation applied to the separately excited field winding of the driven dynamo-electric device, the inductance of its armature is of particular importance. When the speed of the elevator car is to be reduced from running speed to landing speed, the excitation applied to the separately excited field winding of the driven dynamo-electric device is materially reduced. For example, under running conditions, the voltage across the loop circuit may be in the neighborhood of 360 volts, while during the period when the elevator car is operating at landing speed, the voltage across the loop circuit may be of the order of 6 volts. Under these conditions, the flux generated by the separately excited main field winding of the driven dynamo-electric device is at a relatively low value, and consequently, the inductive effect of the armature of this device is of considerable importance. Therefore, in many instances, it is only necessary to provide the neutralizing winding in the pole faces of the driven dynamo-electric device with a view to neutralizing the inductance of its armature.

Referring now particularly to Figs. 1, 2 and 3 of the drawings, an elevator car, shown generally at 10, is provided, which may be of conventional type. The elevator car 10 is supported for movement in the hatchway by means of a cable 11 which is passed over a sheave 12 and which is suitably balanced by means of counterweights 13. The sheave 12 is mounted on a shaft 14 of a hoisting dynamo-electric device 15, which is provided with an armature 16, a separately excited field winding 17 and a neutralizing winding 18. In order to automatically stop the elevator car 10 when the hoisting dynamo-electric device 15 is not energized, a brake, shown generally at 19, is provided having an operating winding 19w.

A driven dynamo-electric device 20 having an armature 21 mounted on a shaft 22, a separately excited field winding 23, a neutralizing winding 24 and a series field winding 25 is provided. The armature 21 is connected in loop circuit relation with the armature 16, as is customary in variable voltage control systems. The shaft 22 may be connected to any suitable driving mechanism, such as a polyphase induction motor (not shown), which may be connected to a suitable source of alternating current.

It will be observed that the neutralizing windings 18 and 24 are connected in series circuit relation with their respective armatures 16 and 21, and are connected in the loop circuit including the armatures 16 and 21 and the series field winding 25. Thus, the current which flows through the armatures 16 and 21 also flows through the neutralizing windings 18 and 24. The particular arrangement of the neutralizing windings 18 and 24 will be set forth in detail hereinafter. At this time, however, it will be again pointed out that the neutralizing winding 18 in the hoisting dynamo-electric device 15 may be dispensed with and that under many operating conditions, it is only necessary to use the neutralizing winding 24 in the driven dynamo-electric device 20.

In order to stop the elevator car 10 at a floor where a call is registered, a floor selector, shown generally at 30, is provided. As illustrated, the floor selector 30 is provided with a lead screw 31 which is arranged to be rotated through a suitable gear reducing mechanism by means of the shaft 14. As is shown more clearly in Fig. 2 of the drawings, the lead screw 31 is arranged to move a brush carriage 32, which carries brushes 33 and 34 for engagement with floor segments when the car moves in the down direction, and corresponding brushes 33' and 34' for engagement with floor segments when the car moves in the up direction. It will be observed that the brush 33 is arranged to successively engage call pick-up segments 2PD through 6PD, while brush 34 is arranged to engage call cancelling segments 2CD through 6CD. In like manner, when the elevator car 10 is moved in the up direction, the brushes 33' and 34' are arranged to engage corresponding floor segments.

Since our invention may be practiced in connection with an elevator system having any desired number of floors, only the connections for floors 2 through 6 are illustrated herein. It will be understood, however, that the system may be extended to a larger number of floors, as may be desired. Further, in order to simplify the showing of our invention, only the circuits associated with the floor segments for the down direction of travel are illustrated in the diagram shown in Fig. 3.

The elevator car 10 may be stopped at a floor where a call is registered by means of a slowdown inductor E and a landing inductor F, both of which are carried by the elevator car. When the operating windings of the inductors E and F are energized, the respective contact members thereof will be opened on moving into proximity with inductor plates located in the hatchway individual to each floor. Thus, as the elevator car 10 approaches the fifth floor in the down direction, with the operating winding of the inductor E energized, contact members E2 will be opened when they come into proximity with the inductor plate DE. In like manner, when the contact members F2 of the landing inductor F come into proximity with the inductor plate DF, they will be opened. Inductor plates UE and UF are provided for opening contact members E1 and F1, respectively, when the car 10 is moved toward the fifth floor in the up direction.

The elevator car 10 is also provided with a master switch MS having three positions. When the handle of the master switch MS is moved to the right, a circuit is completed through contact member MSD for operating the elevator car 10 in the down direction. When the handle is moved to the left, a circuit is completed through contact member MSU to operate the elevator car 10 in the up direction. In the center position, the master switch MS is arranged to complete a circuit for stopping the elevator car 10 at the will of the operator.

In response to the operation of the master switch MS to either the left-hand or the right-hand position, reversing switches U and D are respectively operated. The operating windings of the reversing switches U and D are arranged to be energized through the operating winding of an auxiliary relay N. The elevator car 10 is brought up to full speed by the operation of a speed switch H, which at contact members H1, is arranged to short circuit a resistor 40 that is connected in series circuit relation with the separately excited field winding 23 of the driven dynamo-electric device 20.

Each floor is provided with a hall button, individual to the direction in which it is desired to travel. For example, the fifth floor is provided with a hall button 5U for stopping the elevator car 10 when it is moving in the down direction and a hall button 5D for stopping it in the up direction. Only hall buttons 2D through 6D are illustrated in Fig. 3 herein for the reasons set forth hereinbefore.

In response to the operation of any of the hall buttons 2D through 6D, call storing relays 2DR through 6DR are energized, depending upon the hall button that is operated. As illustrated, the call storing relays are provided with main operating windings and releasing or neutralizing windings 2DRN through 6DRN. When any one of the call storing relays is energized, it is automatically locked in through its own contact members and it remains in this condition until the call cancelling brush 34 engages the corresponding call cancelling segment to complete a circuit for energizing the corresponding neutralizing winding. When this neutralizing winding is energized, a flux is generated thereby which opposes the flux generated by the operating winding and the contact members of the relay are then permitted to be restored to their non-operated position.

When the call pick-up brush 33 comes into contact engagement with a call pick-up segment that is energized as a result of the operation of a call storing relay, a call pick-up relay S is energized. The call pick-up relay S is provided with contact members S1 which are arranged to initiate the slowdown sequence for the elevator car 10.

In order to provide for effecting the energization of the separately excited field windings 17 and 23, as well as for providing for energizing the various operating windings for the switches and relays described hereinbefore, a suitable source of direct current may be provided and connected across conductors L1 and L2. This source may be provided by means of an exciter generator connected to be driven with the armature 21 of the driven dynamo-electric device 20 or by any other suitable source.

In describing the functioning of our novel elevator control system, it will be assumed that the conductors L1 and L2 have applied thereto a suitable energizing voltage. It will also be assumed that the driven dynamo-electric device 20 is connected to be driven by a suitable driving mechanism through which the kinetic energy of the elevator system may be transferred during the slowdown period. It will further be assumed that the elevator car 10 is at the top of the hatchway and that the load conditions are such that no current flows in the loop circuit when the elevator car is operated in the down direction at full speed.

With a view to operating the car in the down direction, the operator moves the master switch MS to complete a circuit through contact member MSD for energizing the reversing switch D and the auxiliary relay N. This circuit may be traced as follows:

L1, MS, MSD, F2, D, N, L2

The separately excited field winding 23 of the driven dynamo-electric device is energized over a circuit which may be traced as follows:

L1, D3, 23, D1, 40, L2

Also, the brake winding 19w is energized to release the brake 19.

L1, 19w, D2, L2

The elevator car 10 is operated at full speed in the down direction on the energization of the speed switch H, which at contact members H1, short circuits the resistor 40 and permits full excitation to be applied to the separately excited field winding 23. The circuit for energizing the operating winding of the speed switch H may be traced as follows:

L1, D4, E2, H, L2

It will now be assumed that the down call button 5D is operated at the fifth floor for the purpose of stopping the car at this floor in order to admit a passenger. As a result of the depression of the call button 5D, a circuit is completed for energizing the call storing relay 5DR.

L1, 5D, 5DR, L2

At contact members 5DR1 a holding circuit is completed around the contact members of the call button 5D, for the purpose of maintaining the call storing relay 5DR in the operated condition until the call is cancelled. A further result of the energization of the call storing relay 5DR is to close contact members 5DR2 and connect the down call pick-up segment 5PD to conductor L1.

As soon as the call pick-up brush 33 engages the call pick-up segment 5PD, an obvious circuit is completed for energizing the operating winding of the call pick-up relay S. It, in turn, completes, at contact members S1, a circuit for energizing a holding relay J.

L1, S1, J, N1, L2

At contact members J1, an obvious holding circuit is completed which obviates the necessity for the contact members S1 to be maintained in the closed position for a time longer than is necessary to energize the operating winding of the holding relay J.

The operating winding of the slowdown inductor E is energized in parallel circuit relation with the operating winding of the holding relay J. It is then in condition to open contact members E2 as soon as they come into proximity with the slowdown inductor plate DE. It will be understood that the call pick-up brush 33 is given a sufficient lead in its location on the brush carriage 32, so that the foregoing sequence of operations can take place before the contact members E2 are moved into proximity with the inductor plate DE.

As soon as the elevator car 10 carries the contact members E2 into proximity with the inductor plate DE, they are opened and the previously traced circuit for energizing the operating winding of the speed switch H is opened. Accordingly, the contact members H1 are opened and the resistor 40 is reinserted in series circuit relation with the separately excited main field winding 23 of the driven dynamo-electric device 20.

Since the excitation applied to the driven dynamo-electric device 20 has been materially reduced, it will function as a motor, returning power to the power source through the shaft 22, while the hoisting dynamo-electric device 15 functions as a generator to energize the device 20. It will be understood that the excitation applied to the separately excited field winding 23 may be reduced in a number of steps, rather than by the insertion of a single resistor 40. However, for the purposes of illustration, only the single step of resistance, as represented by the resistor 40, is illustrated herein.

For the purposes of clarity, the remaining steps in the slowdown sequence will be set forth before a detailed description is given, regarding the particular functioning of the neutralizing windings 18 and 24 during the slowdown period. For the time being, it will be assumed that the speed of the elevator car 10 is reduced in the desired manner.

The deenergization of the speed switch H causes contact members H2 to close and thereby completes a circuit for energizing the operating winding of the landing inductor F in parallel circuit relation with the operating winding of the slowdown inductor E. Consequently, as soon as contact members F2 are moved into proximity with the inductor plate DF, they are opened. The previously traced holding circuit for the reversing switch D and the auxiliary relay N is then opened at contact members F2. As a result, the separately excited field winding 23 is deenergized, the operating winding 19w of the brake 19 is deenergized, and the brake is applied to stop the elevator car 10 at the fifth floor.

As the elevator car 10 reaches the fifth floor, the call canceling brush 34 engages the call canceling segment 5CD and an energizing circuit is completed for the neutralizing winding 5DRN.

L1, 5DR1, 5DRN, 5CD, 34, H3, L2

The call storing relay 5DR is then restored to the non-operated position.

After the passenger has entered the elevator car 10, the operator may then again move the master switch MS to the right, to again initiate the movement of the elevator car in the down direction.

In order to more clearly demonstrate the novel features of our invention, reference may be had to Figs. 5 through 8 of the drawings. In these figures, a comparison is shown between operating conditions during the slowdown period from running speed to landing speed, in the first instance, with inductance in the loop circuit, and in the second instance, without inductance in the loop circuit.

With particular reference to Fig. 5, it will be observed that the curve 41 represents the change in voltage across the loop circuit plotted with units of voltage as ordinates and time as abscissæ. This curve represents the change in voltage during the slowdown period which is caused by the reduction in excitation applied to the separately excited main field winding 23 of the driven dynamo-electric device 20. The desired speed-time relationship of the elevator car 10 during the slowdown period may be represented by the curve 42 which is plotted with units of car speed as ordinates and time as abscissæ. It will be observed that this curve indicates the desired rate of deceleration or reduction in speed of the elevator car to be at a uniform rate and that a certain definite landing speed should be obtained preparatory to applying the brake for stopping the car at the desired floor. The curve 43 represents the current flowing in the loop circuit, units of current being plotted as ordinates and time as abscissæ. It will be observed that the current flow as indicated by this curve is irregular and that a corresponding irregularity appears in the actual car speed which may be represented by the curve 44, which is plotted to the same units as curve 42.

It will be assumed that the car is being operated in the down direction and that the load is such that no current is flowing in the loop circuit. This condition is indicated by the first part of the loop circuit current curve 43. At a time 5T1 the contact members H1 described hereinbefore, are opened in response to the deenergization of the speed switch H. The excitation applied to the separately excited main field winding 23 is then reduced and as a result, the voltage across the loop circuit decreases as indicated by the loop circuit voltage curve 41. In order to reduce the speed of the elevator car to landing speed, it is necessary to remove the kinetic energy of the system and this is accomplished, as set forth hereinbefore, by returning power to the power source through the shaft 22. Since the desired car speed, as indicated by the curve 42, decreases at a uniform rate, it is necessary that the current flowing in the loop circuit reach a predetermined constant value, in order to provide this uniform rate of speed reduction or deceleration. It will be understood that a constant current is required for effecting the desired reduction in car speed, due to the fact that a constant torque is applied to the hoisting dynamo-electric device 15, and that the field flux therein is maintained at a substantially constant value.

However, due to the fact that the loop circuit includes as a portion thereof the armature 21 of the driven dynamo-electric device 15, which is highly inductive, the current flowing in the loop circuit does not reach the desired constant value instantaneously, but rather requires an appreciable time. The inductive effect of the armature 21 may be illustrated as shown in Fig. 7 of the drawings. The armature 21 comprises a core 45 having an armature winding 46 comprising several conductors disposed in slots in the periphery thereof. Only two field poles 47 are illustrated, although it will be understood that a larger number is ordinarily used. When current flows through the conductors of the armature winding 46 in the direction indicated, fluxes will be set up in the magnetic structure surrounding the conductors. Since the conductors of the armature winding 46 are surrounded by iron paths, the inductance of the armature winding 46 will be high, and as a result, considerable time must elapse before the required current is permitted to flow therethrough, which is necessary for applying the necessary braking torque to the shaft 14 for slowing down the elevator car at the desired rate.

While the armature 21 of the driven dynamo-electric device 20 only is illustrated in Fig. 7, it will be understood that the same conditions exist in the armature 16 of the hoisting dynamo-electric device 15. However, as set forth hereinbefore, due to the fact that the field structure of the hoisting dynamo-electric device 15 is operating under saturated conditions during the slowdown period, it is not as essential to provide for neutralizing the inductance of the armature winding of the armature 16, as it is to neutralize the inductance of the armature winding 46 of the armature 21.

Due to the fact that the current, as represented by the curve 43, does not instantaneously reach the final constant value which is represented by the horizontal portion of this curve, the speed of the elevator car does not follow the desired car speed, as indicated by the curve 42, but rather is reduced as represented by the curve 44. It will then be observed that at a time 5T2 when the current in the loop circuit is at substantially the desired value, the speed of the elevator car is above the desired speed. Because the car speed is higher than desired, more kinetic energy must be removed from the system than would otherwise be the case if the car speed decreased according to curve 42 and, therefore, the current further increases, until at a time 5T3, when the speed of the car is correct, the current flowing in the loop circuit is greater than the desired current. However, because of the inductance in the loop circuit, due principally to the inductance of the armature winding 46, the current cannot immediately drop to the required steady-state value, and as a result, the car during this period, is decelerated at a greater rate than is desired. When the time 5T4 is reached, the current in the loop circuit has reached the desired value but the speed of the car is lower than is desired. The loop circuit current then continues to decrease until a time 5T5, the change in the rate of deceleration ceases and the current at time 5T6 finally arrives at the desired steady-state value.

At the time 5T6, however, it will be observed that the actual car speed is above the desired car speed. Therefore, at the end of the slowdown period, at time 5T7, the elevator car will be operating at a speed which is above the desired landing speed, as represented by the curve 42. At this time, since the speed of the elevator car is approximately at the landing speed, the torque which is applied to the shaft 14 is considerably reduced. As a result, the current flowing in the loop circuit decreases. However, due to the inductance of the loop circuit which, as set forth hereinbefore, is due to a large extent to the inductance of the armature winding 46, the car in the loop circuit does not decrease instantaneously, but rather decreases, as indicated by the curve 43, immediately after the time 5T7.

Due to the fact that the current in the loop circuit does not decrease instantaneously, the speed of the elevator car is reduced to a value below the desired landing speed, so that at time 5T8, the car speed, as indicated by the curve 44, is less than the landing speed indicated by the curve 42. It is, therefore, necessary to increase the speed of the elevator car, and current is caused to flow in a reverse direction through the loop circuit. However, due to the inductance of the loop circuit, the speed of the elevator car increases to a value above the desired landing speed, so that at time 5T9 the car is operating at a speed slightly above the landing speed. This action will continue depending upon the constants of the loop circuit, and the load which is carried by the elevator car until time 5T11, at which it may be assumed that the speed of the elevator car has ceased oscillating about the desired landing speed. In order to be certain, however, that the elevator car has ceased oscillating about the desired landing speed, the final step in the control is not initiated until time 5T12. At this time, the reversing switch D is deenergized and the brake 19 is applied, bringing the car to rest at the floor at time 5T13.

Had the reversing switch D been opened at the time 5T8, it is apparent that the elevator car would have been stopped somewhat in advance of the floor, due to the fact that the time allowed for coasting is determined with the car operating at the desired landing speed. On the other hand, had the reversing switch D been deenergized at the time 5T10, the car would have passed the floor, since at the time that the brake would be applied under these conditions, the car would be operating at a speed greater than landing speed.

It will, therefore, be apparent that the inductance in the loop circuit constitutes a factor which introduces a variable in the operation of the elevator car during the slowdown period, which requires that this period be extended considerably, in order to insure that the correct landing speed is obtained. It is, therefore, highly desirable that the inductance in the loop circuit be reduced to a minimum so that the effect thereof will not constitute a factor which must be considered in bringing the car to rest at the floor level.

In order to cause the speed of the car to be reduced at a uniform rate and to be stopped within a minimum of time after the slowdown period has been initiated, the neutralizing winding 24, located in the pole faces of the poles 47, is provided. As indicated in Fig. 8 of the drawings, the conductors forming the neutralizing winding 24 are so connected that current flows through them in such a direction as to generate flux in opposition to the flux generated by the conductors forming the armature winding 46. As a result, on flow of current through the armature winding 46, substantially no flux is generated thereby, and the armature winding takes on the nature of a non-inductive winding.

As illustrated in Fig. 6, at the time 6T1 the current in the loop circuit, as represented by the curve 53, is changed substantially instantaneously to the final value which is required to provide the desired rate of deceleration, in response to the reduction in the voltage across the loop circuit, as represented by the curve 54. As a result, the speed of the car is decreased at a rate which may be represented by the curve 55. It will be understood, of course, that the current flowing through the loop circuit does not instantaneously arrive at its final value. However, for practical purposes, and for the purposes of illustration, it may be considered to do so and has been so illustrated.

At the time 6T2 the speed of the elevator car has been reduced to landing speed, and as a result, no further torque is applied for regenerative braking. Due to the fact that the loop circuit may be considered to contain no inductance, the current therein is instantaneously reduced to zero. There is, therefore, no oscillation in the speed of the elevator car above and below the desired landing speed, as is the case when the loop circuit contains an appreciable amount of inductance. At a time 6T3, the reversing switch D may be deenergized and the brake 19 applied, the car being brought to rest at the floor at time 6T4.

It will be obvious, in comparing the functioning of the elevator system with and without the neutralizing winding 24, that the time required to stop the car accurately at a floor after the instant of time when the car should be operating at the landing speed, is considerably reduced. When it is necessary to take into consideration the oscillations of the elevator car above and below the landing speed, as illustrated by the curve 44 in Fig. 5, it is necessary to allow a considerable time, such as four to five seconds, before the reversing switches can be deenergized and the brake applied. Such a relatively long time interval is necessary in order to insure that all types of loads may be properly brought to rest at a floor with the desired degree of accuracy. It will thus be apparent that when the neutralizing winding 24 is employed to neutralize the inductive effect of the armature winding 46, this time may be materially reduced. Regardless of the load conditions, the speed of the elevator car will be reduced to landing speed without the oscillations incident to the circuit without the neutralizing effect. In many instances, the elevator car need operate at the landing speed only for possibly two seconds before the reversing switches may be deenergized and the brake applied.

It will, therefore, be apparent that the speed of operation of the elevator car is materially increased and that passengers carried thereby are subjected to a minimum degree of discomfort due to rapidly changing rates of deceleration of the elevator car during the slowdown period.

Since certain further changes may be made in the foregoing construction and different embodiments thereof may be made without departing from the scope thereof, it is intended that all matter contained in the above description and shown in the accompanying drawings shall be interpreted as illustrative and not in a limiting sense.

We claim as our invention:

1. In a control system for an elevator car operable past a plurality of floors, in combination, a first dynamo-electric device having an armature in driving connection with the elevator car, a second dynamo-electric device having an armature connected in loop circuit to said first-named armature and a separately excited field winding, means for reducing the excitation applied to said field winding for reducing the speed of the elevator car from a high operating speed to a low speed preparatory to stopping it at a floor, and means for minimizing the inductances of said armatures to render the change of current flow through said loop circuit during the slowdown period substantially unaffected by said inductances.

2. In a control system for an elevator car operable past a plurality of floors, in combination, a first dynamo-electric device having an armature in driving connection with the elevator car, a second dynamo-electric device having an armature connected in loop circuit to said first-named armature, means for reducing the excitation applied to said second dynamo-electric device for reducing the speed of the elevator car from a high operating speed to a low speed preparatory to stopping it at a floor, and means for neutralizing the inductances of said armatures in opposing the change of flow of current therethrough during the slowdown period, thereby permitting the speed of the elevator car to be reduced at a substantially uniform rate.

3. In a control system for an elevator car operable past a plurality of floors, in combination, a first dynamo-electric device having an armature in driving connection with the elevator car, a second dynamo-electric device having an armature connected in loop circuit to said first-named armature, means for reducing the excitation applied to said second dynamo-electric device for reducing the speed of the elevator car from a high operating speed to a very low speed preparatory to stopping it at a floor, and means for neutralizing the inductive effect of said armatures in opposing the change of current flow through said loop circuit during the slowdown period, said means comprising a neutralizing winding in each of said devices.

4. In a control system for an elevator car operable past a plurality of floors, in combination, a first dynamo-electric device having an armature in driving connection with the elevator car, a second dynamo-electric device having an armature connected in loop circuit to said first-named armature and a separately excited field winding, means for reducing the excitation applied to said field winding for reducing the speed of the elevator car to landing speed preparatory to stopping it at a floor, and means for neutralizing the inductive effect of said armatures in opposing the change of current flow through said loop circuit during the slowdown period, said means comprising a neutralizing winding disposed in the pole faces of each of said devices and connected in series circuit relation in said loop circuit in such manner as to generate a flux opposing the flux generated by the current flowing through said armatures, thereby permitting the speed of the elevator car to be reduced at a substantially uniform rate over the entire speed range between full speed and landing speed.

5. In a control system for an elevator car operable past a plurality of floors, in combination, a first dynamo-electric device having an armature in driving connection with the elevator car, a second dynamo-electric device having an armature connected in loop circuit to said first-named armature and a separately excited field winding, means for automatically reducing the excitation applied to said field winding in response to a call at a floor for reducing the speed of the elevator car to landing speed preparatory to stopping it at the floor where the call is registered, and means for minimizing the inductances of said armatures in opposing the change of flow of current through said loop circuit during the slowdown period, thereby permitting the speed of the elevator car to be reduced at a substantially uniform rate.

6. In a control system for an elevator car operable past a plurality of floors, in combination, a first dynamo-electric device having an armature in driving connection with the elevator car, a second dynamo-electric device having an armature connected in loop circuit to said first-named armature, means for automatically reducing the excitation applied to said second dynamo-electric device in response to a call at a floor for reducing the speed of the elevator car from a high operating speed to a very low speed preparatory to stopping it at the floor where the call is registered, and means for neutralizing the inductances of said armatures in opposing the change of flow of current therethrough during the slowdown period, thereby permitting the speed of the elevator car to be reduced at a substantially uniform rate.

7. In a control system for an elevator car operable past a plurality of floors, in combination, a first dynamo-electric device having an armature in driving connection with the elevator car, a second dynamo-electric device having an armature connected in loop circuit to said first-named armature and a separately excited field winding, means for automatically reducing the excitation applied to said field winding in response to a call at a floor for reducing the speed of the elevator car to landing speed preparatory to stopping it at the floor where the call is registered, and means for neutralizing the inductive effect of said armatures in opposing the change of current flow through said loop circuit during the slowdown period, said means comprising a neutralizing winding in each of said devices.

8. In a control system for an elevator car operable past a plurality of floors, in combination, a first dynamo-electric device having an armature in driving connection with the elevator car, a second dynamo-electric device having an armature connected in loop circuit to said first-named armature and a separately excited field winding, means for automatically reducing the excitation applied to said field winding in response to a call at a floor for reducing the speed of the elevator car to landing speed preparatory to stopping it at the floor where the call is registered, and means for neutralizing the inductive effect of said armatures in opposing the change of current flow through said loop circuit during the slowdown period, said last-named means comprising a neutralizing winding disposed in the pole faces of each of said devices and connected in series circuit relation in said loop circuit in such manner as to generate a flux opposing the flux generated by the current flowing through said armatures, thereby permitting the speed of the elevator car to be reduced at a substantially uniform rate over the entire speed range between full speed and landing speed.

9. In a control system for an elevator car operable past a plurality of floors, in combination, a first dynamo-electric device having an armature in driving connection with the elevator car, a second dynamo-electric device having an armature connected in loop circuit to said first-named armature and a separately excited field winding, means for reducing the excitation applied to said field winding for reducing the speed of the elevator car to landing speed preparatory to stopping it at a floor, and means for neutralizing the inductance of said second-named armature to render the current flow therethrough during the slowdown period substantially unaffected by said inductance.

10. In a control system for an elevator car operable past a plurality of floors, in combination, a first dynamo-electric device having an armature in driving connection with the elevator car, a second dynamo-electric device having an armature connected in loop circuit to said first-named armature, means for reducing the excitation applied to said second dynamo-electric device for reducing the speed of the elevator car from a high operating speed to a very low speed preparatory to stopping it at a floor, and means for neutralizing the inductance of said second-named armature in opposing the change of flow of current through said loop circuit during the slowdown period, thereby permitting the speed of the elevator car to be reduced at a substantially uniform rate.

11. In a control system for an elevator car operable past a plurality of floors, in combination, a first dynamo-electric device having an armature in driving connection with the elevator car, a second dynamo-electric device having an armature connected in loop circuit to said first-named armature and a separately excited field winding, means for reducing the excitation applied to said field winding for reducing the speed of the elevator car to landing speed preparatory to stopping it at a floor, and means for neutralizing the inductive effect of said last-named armature in opposing the change of current flow through said loop circuit during the slowdown period, said means comprising a neutralizing winding in said second dynamo-electric device.

12. In a control system for an elevator car operable past a plurality of floors, in combination, a first dynamo-electric device having an armature in driving connection with the elevator car, a second dynamo-electric device having an armature connected in loop circuit to said first-named armature, means for reducing the excitation applied to said second dynamo-electric device for reducing the speed of the elevator car from a high operating speed to a very low speed preparatory to stopping it at a floor, and means for neutralizing the inductive effect of said last-named armature in opposing the change of current flow through said loop circuit during the slowdown period, said last-named means comprising a neutralizing winding disposed in the pole faces of said second dynamo-electric device and connected in series circuit relation in said loop circuit in such manner as to generate a flux in opposition to the flux generated by the current flowing through said second-named armature, thereby permitting the speed of the elevator car to be reduced at a substantially uniform rate from full speed to landing speed.

13. In a control system for an elevator car operable past a plurality of floors, in combination, a first direct-current dynamo-electric device having an armature core disposed in driving connection to the elevator car, an armature winding carried by said armature core, a second direct-current dynamo-electric device having a separately excited field winding and an armature core disposed to be driven, an armature winding carried by said last-named armature core, said armature windings being connected in loop circuit relation, means for automatically reducing the excitation applied to said separately excited field winding in response to a call at a floor for reducing the speed of the elevator car to landing speed preparatory to stopping it at the floor where the call is registered, and means for minimizing the inductance of said second-named armature winding in opposing the change of flow of current through said loop circuit during the slowdown period thereby permitting the speed of the elevator car to be reduced at a substantially uniform rate.

14. In a control system for an elevator car operable past a plurality of floors, in combination, a first direct-current dynamo-electric device having an armature core disposed in driving connection to the elevator car, an armature winding carried by said armature core, a second direct-current dynamo-electric device having a separately excited field winding and an armature core disposed to be driven, an armature winding carried by said last-named armature core, said armature windings being connected in loop circuit relation, means for automatically reducing the excitation applied to said separately excited field winding in response to a call at a floor for reducing the speed of the elevator car to landing speed preparatory to stopping it at the floor where the call is registered, and means for neutralizing the inductance of said second-named armature winding in opposing the change of flow of current through said loop circuit during the slowdown period, thereby permitting the speed of the elevator car to be reduced at a substantially uniform rate.

15. In a control system for an elevator car operable past a plurality of floors, in combination, a first direct-current dynamo-electric device having an armature core disposed in driving connection to the elevator car, an armature winding carried by said armature core, a second direct-current dynamo-electric device having an armature core disposed to be driven, an armature winding carried by said last-named armature core, said armature windings being connected in loop circuit relation, means for automatically reducing the excitation applied to said second dynamo-electric device in response to a call at a floor for reducing the speed of the elevator car from a high operating speed to a very low speed preparatory to stopping it at the floor where the call is registered, and means for neutralizing the inductive effect of said second-named armature winding in opposing the change of current flow through said loop circuit during the slow-down period comprising a neutralizing winding in said second dynamo-electric device.

16. In a control system for an elevator car operable past a plurality of floors, in combination, a first direct-current dynamo-electric device having an armature core disposed in driving connection to the elevator car, an armature winding carried by said armature core, a second direct-current dynamo-electric device having a separately excited field winding and an armature core disposed to be driven, an armature winding carried by said last-named armature core, said armature windings being connected in loop circuit relation, means for automatically reducing the excitation applied to said separately excited field winding in response to a call at a floor for reducing the speed of the elevator car to landing speed preparatory to stopping it at the floor where the call is registered, and means for neutralizing the inductive effect of said second-named armature winding in opposing the change of current flow through said loop circuit during the slow-down period comprising a neutralizing winding disposed in the pole faces of said second dynamo-electric device and connected in series circuit relation in said loop circuit in such manner as to generate flux in opposition to the flux generated by the current flowing through said second-named armature winding, thereby permitting the speed of the elevator car to be reduced at a substantially uniform rate from full speed to landing speed.

17. In a control system for an elevator car operable past a plurality of floors, in combination, a first direct-current dynamo-electric device having an armature core disposed in driving connection to the elevator car, an armature winding carried by said armature core, a second direct-current dynamo-electric device having an armature core disposed to be driven, an armature winding carried by said last-named armature core, said armature windings being connected in loop circuit relation, means for automatically reducing the excitation applied to said second dynamo-electric device in response to a call at a floor for reducing the speed of the elevator car from a high operating speed to a very low speed preparatory to stopping it at the floor where the call is registered, means comprising a neutralizing winding disposed in said second-named dynamo-electric device for neutralizing the inductive effect of said second-named armature winding, and means for causing current to flow through said neutralizing winding proportional to the current flow through said second-named armature winding.

18. In a Ward-Leonard system for controlling the operation of an elevator motor, in combination, means for causing said motor to operate at a high speed and at least one lower speed, and means for preventing hunting during the transition between said speeds caused by the inductance of the armature of said motor comprising a winding in the pole faces of said motor, said winding carrying at least a part of the armature current of said motor in a direction to neutralize the inductance of said armature.

19. In a system for controlling the operation of a direct-current elevator motor, in combination, a direct-current generator having its armature connected in loop circuit relation with the armature of said motor, means for controlling the functioning of said generator to operate said motor at a high speed and at least one lower speed, and means for preventing hunting during transition between said speeds caused by the inductance of the armature of said generator comprising a winding in the pole faces of said generator, said winding carrying at least part of the armature current of said generator in a direction to neutralize the inductance of said armature.

WILLIAM R. HARDING.
EDGAR M. BOUTON.